J. A. COSTUMA.
SCREW OR LIKE ARTICLE.
APPLICATION FILED DEC. 27, 1916.

1,296,165.

Patented Mar. 4, 1919.

INVENTOR
Jacob A. Costuma
BY
ATTORNEY

UNITED STATES PATENT OFFICE.

JACOB A. COSTUMA, OF NEW YORK, N. Y.

SCREW OR LIKE ARTICLE.

1,296,165.  Specification of Letters Patent.  Patented Mar. 4, 1919.

Application filed December 27, 1916. Serial No. 139,096.

*To all whom it may concern:*

Be it known that I, JACOB A. COSTUMA, a citizen of the United States, and a resident of the borough of Manhattan, city, county, and State of New York, have invented certain new and useful Improvements in Screws or Like Articles, of which the following is a specification.

This invention relates to screws, nails, bolts, and the like, and particularly to means whereby such articles may be securely locked in place in such a manner that any attempt to loosen or remove them will be detected easily.

For the purpose, I provide a construction by which a body of suitable, readily molded material, such as wax or solder, may be formed in contact with such screw or other article and with the socket of the plate or other part into which such article extends, such body of readily molded material having a portion which forms a key to prevent undetected removal of said body and of said article, as will be more fully set forth hereinafter.

Figure 2:
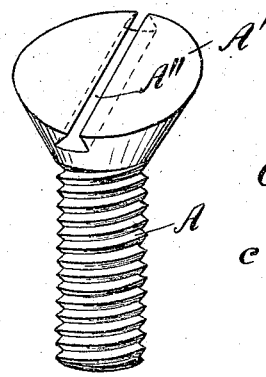
Figure 1:
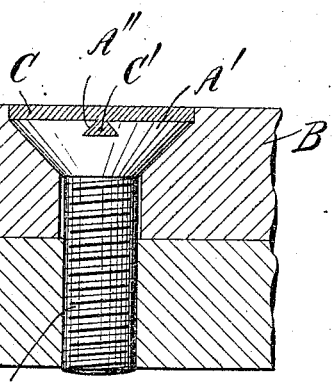
Figure 3:
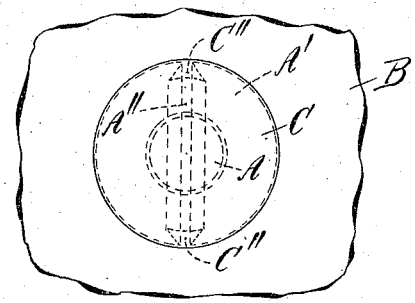

My invention may be carried out in many forms, three examples of which are shown in the accompanying drawings, Figure 1 being a longitudinal section of a plate with a screw fitted into it, embodying my invention; Fig. 2 is a perspective view of such screw; Fig. 3 is an end view of the parts shown in Fig. 1; and Figs. 4 and 5 are views corresponding to Fig. 1, and showing two other forms of my invention.

The screw has a threaded shank A and a conically-enlarged head A' provided with a diametrically-extending slot in its upper or end surface. Instead of being of uniform width, as is the slot provided in the head of an ordinary screw for the insertion of a screw-driver, the slot, groove, or recess A'' of the screw shown in Figs. 1, 2, and 3, is widened at its inner portion, preferably in dovetail fashion.

Figure 4:
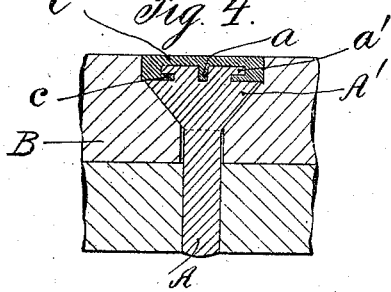
Figure 5:
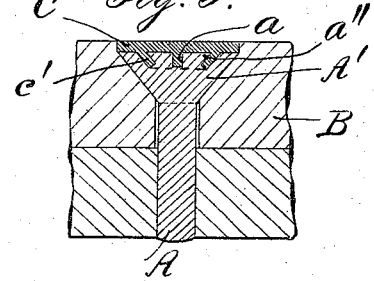

A screw of this improved construction is fitted into a plate or other part B provided with a socket in which the head A' of the screw may be countersunk, as shown in Figs. 1, 4, and 5. This socket generally has a flaring wall corresponding to the shape of the screw head, although that portion of the socket wall which lies exteriorly of the screw head (when the screw has been inserted fully) may be cylindrical, and preferably is so formed.

After the screw has been brought to the position shown in Fig. 1, it is locked and protected against undetected tampering, by filling the outer portion of the socket, as well as the slot, or undercut recess A'' of the screw, with a body C of suitable readily molded material, for which I might employ solder, lead, wax, putty, plaster of Paris, and the like. When this body enters the slot A'' of the screw, it will form a portion C' widened inwardly, and thus interlocking with the screw, so that it will be impossible to remove the body C, C' by pulling on it outwardly, lengthwise of the screw, without breaking or marring either said body or the screw or the plate in which it is fitted, so that any attempts at such removal would be detected easily. The outer surface of the body C is preferably flush with that of the plate or other part B, thus rendering it still more difficult to attempt removal of the body C and of the screw without leaving some traces of such attempt. When the body C is of opaque material, as it will be generally, the slot A'' will be invisible, and a person wishing to apply a screw-driver to said slot will be compelled to scratch or chisel away a relatively considerable portion of said body C before the direction of the slot can be determined. Thus my invention affords sufficient security against undetected tampering with the screw A, or the like.

Furthermore, since the body C will generally adhere strongly to the screw head and to the socket wall, such body will also lock the screw against accidental and malicious loosening.

Finally, the body C, by concealing the screw A, also improves the appearance and finish of the entire structure, particularly when the exposed outer surface of such body is flush with that of the plate or other part receiving the head of the screw A.

The practically trapezoidal ends C'' of the widened portion or key C' of the body C will adhere strongly to the wall of the conical socket of the plate B and will thus prevent or at least render very difficult, the turning of the screw by means of a screw-driver inserted into the slot A'' after the solder or other material of the body C has been scraped or gouged out of said slot, or recess, since even in that case some material of said body will remain in the ends of the slot A'' and will stick to the wall of the socket.

In the two forms of construction, illustrated by Figs. 4 and 5, the screw head A' is made with the ordinary transverse slot or recess a of even width, and the key c or c' of the body C is formed by a portion extending under an undercut portion a' or a" respectively of the head A'. In Fig. 4, the key c fills an annular groove or recess cut under the head portion a'. In Fig. 5, the key c' and the undercut portion a" are of frusto-conical shape.

In each of the forms shown, the body C of readily molded material is formed with a key fitted under an overlying portion, the latter thus locking the body so that it cannot be removed by an outward pull.

It will be understood that my invention may be practiced in connection with nails, bolts and pegs, the employment thereof in such devices being contemplated by my invention.

What I claim is:

1. A part provided with a socket, a screw provided with a head located within said socket, said screw head being provided with a slot whose walls diverge downwardly, and a body of readily molded material in contact with the screw head and the wall of said socket and extending into and filling said slot from wall to wall, to form a permanent lock for said material and the screw.

2. A part provided with a socket, a screw provided with a head located within said socket, said screw head being provided with a downwardly extending slot having diagonal walls, and a body of readily molded material in contact with the screw head and the wall of said socket and extending into and filling said slot to form a permanent lock for said material and the screw.

3. A part provided with a socket, a screw provided with a head located within said socket said head having a transverse slot of dove-tail formation and located within said socket and a body of readily molded material in contact with said head and with the wall of said socket, and formed with a key locked in position in said socket.

4. A part provided with a socket, a screw having a head, an undercut annular groove in said head and a body of readily molded material in contact with said head, with its annular groove and with the wall of said socket.

JACOB A. COSTUMA.

Copies of this patent may be obtained for five cents each, by addressing the "Commissioner of Patents, Washington, D. C."